United States Patent [19]
Wright

[11] 3,796,229
[45] Mar. 12, 1974

[54] DUAL VALVE ACTUATOR ASSEMBLY

[75] Inventor: John W. Wright, Anaheim, Calif.

[73] Assignee: Robertshaw Controls Company, Richmond, Va.

[22] Filed: Nov. 20, 1972

[21] Appl. No.: 307,906

[52] U.S. Cl.................... 137/495, 251/30, 251/138, 137/627.5
[51] Int. Cl............................................ F16k 31/10
[58] Field of Search .............. 251/30, 129, 138, 11; 137/495

[56] References Cited
UNITED STATES PATENTS
3,210,041   10/1965   Mitts................................... 251/138
3,442,483   5/1969   Schwartz............................. 251/11

*Primary Examiner*—Arnold Rosenthal
*Attorney, Agent, or Firm*—Anthony A. O'Brien

[57] ABSTRACT

A dual valve actuator assembly for substantially simultaneously operating a pair of bleed line valves for controlling a differential pressure operated valve in a control device, the assembly including an electromagnetic operator controlling an armature which operates a spring member having an operating end controlling valve members for the bleed line valves and a keeper spring pinned to the armature and tensioned to bias a central portion of the armature against a pole face of a core of the electromagnetic operator.

11 Claims, 3 Drawing Figures

3,796,229

DUAL VALVE ACTUATOR ASSEMBLY

BACKGROUND OF THE INVENTION

1. Field of the Invention

The present invention pertains to valve actuators and, more particularly, to a dual valve actuator assembly for bleed line valves controlling a differential pressure operated valve.

2. Discussion of the Prior Art

It is known to control a differential pressure operated valve in a control device by operating bleed line valves in accordance with a space or area temperature to control the pressure in a valve operating pressure chamber, such controls being particularly advantageous for use in controlling fuel flow to burner apparatus in temperature control systems. While various actuator assemblies for operating the bleed line valves have been utilized in the prior art, such actuator assemblies constructed to be responsive to the opening and closing of a thermostat have had a tendency to hang up or stick during operation; and, thus, there has been a continuous search for bleed line valve actuator assemblies which are relatively simple in structure, low cost and free of any tendency to stick or otherwise malfunction during operation. Furthermore, such bleed line valve actuator assemblies should desirably operate the valves with a snap action to avoid throttling.

SUMMARY OF THE INVENTION

Accordingly, it is a primary object of the present invention to provide a bleed line valve actuator assembly of simplified structure free of any tendency to hang up or stick during operation.

Another object of the present invention is to construct a valve actuator assembly for operating a valve with snap action in response to operation of a thermostatis switch.

A further object of the present invention is to utilize a spring member to operate a pair of bleed line valves substantially simultaneously under the control of an electromagnetic operator.

The present invention has another object in that a keeper spring is pinned to an armature in a valve actuating assembly to minimize shifting relative to pole faces.

Some of the advantages of the present invention over the prior art are that the valve actuator assembly provides snap action, non-sticking control of bleed line valves while utilizing relatively simple, low cost structure.

The present invention is generally characterized in a valve actuator assembly including casing having a valve seat therein, an electromagnetic operator disposed in the casing and having first and second pole faces, an armature having a central portion engaging the first pole face, a first end aligned with the second pole face and a second end extending beyond the electromagnetic operator, and a spring member having a first end mounted on a shoulder in the casing, a second end carrying a valve member in alignment with the valve seat and an intermediate portion engaging the second end of the armature such that movement of the armature imparts movement to the spring member, the spring member being tensioned to bias the valve member toward the valve seat and to bias the armature against the first pole face, the valve member engaging the valve seat and the first end of the armature being spaced from the second pole face by the tension of the spring member when the electromagnetic operator is deenergized, and the valve member being moved away from the valve seat and the first end of the armature being pulled in to contact the second pole face against the tension of the spring member when the electromagnetic operator is energized.

Other objects and advantages of the present invention will become apparent from the following description of the preferred embodiment taken in conjunction with the accompanying drawings.

DESCRIPTION OF THE PREFERRED EMBODIMENT

Figure 1:
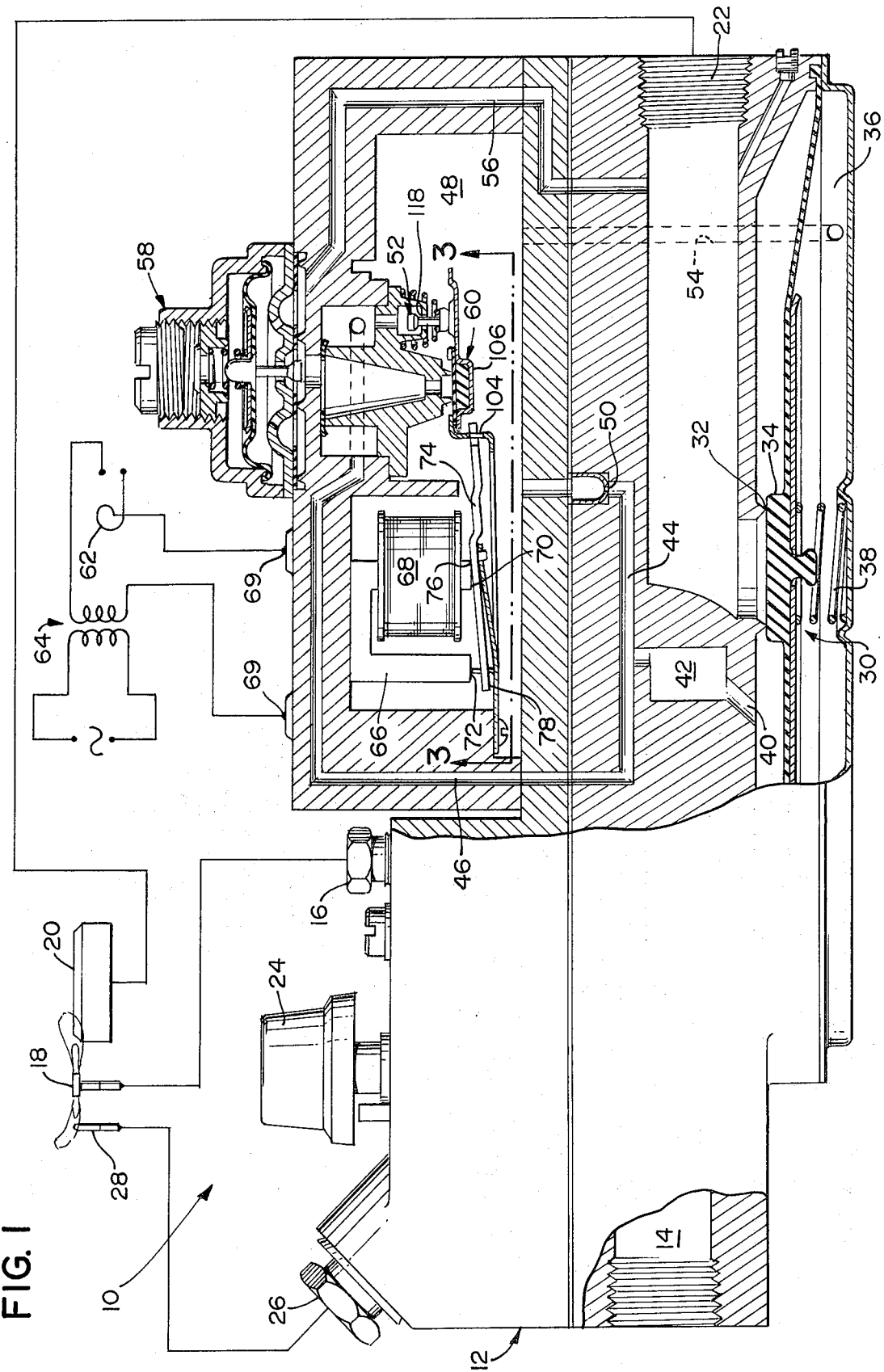
FIG. 1 is a broken section of a control device including a dual valve actuator assembly according to the present invention in a closed state.
Figure 2:
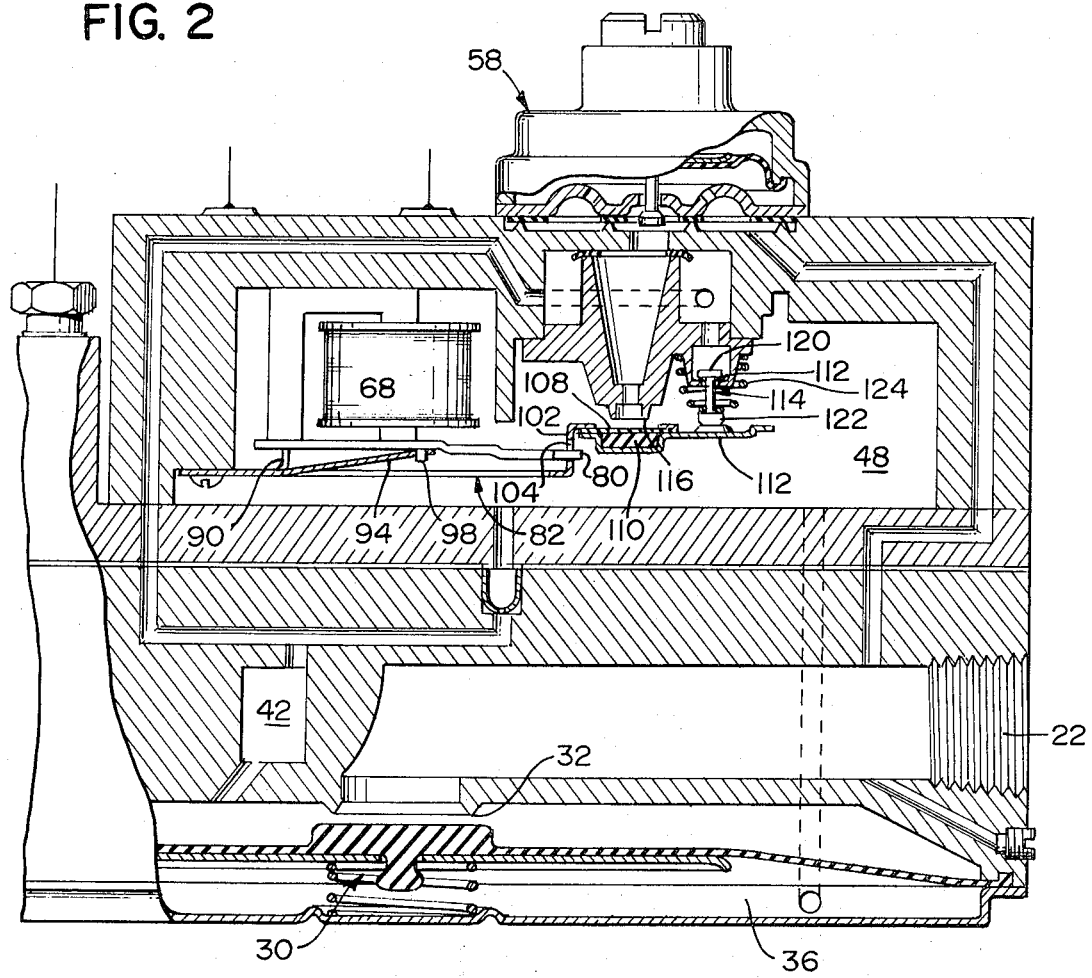
FIG. 2 is a broken section of the dual valve actuator assembly of FIG. 1 in an open state.

A control device 10 including a dual valve actuator assembly according to the present invention is illustrated in FIG. 1 and 2 and includes a casing 12 having an inlet 14 receiving fuel from a suitable supply, a pilot outlet 16 for supplying fuel to a pilot burner 18 disposed in igniting proximity to a main burner 20, and a main outlet 22 for supplying fuel to the main burner 20. A manual operating knob 24 operates a plug valve, not shown, within casing 12 to control fuel flow through the casing. A safety valve, not shown, is disposed between inlet 14 and the plug valve and is operated by an electromagnetic operator 26 responsive to current from a thermocouple 28 disposed in the flame of pilot burner 18. Downstream of the plug valve is a main valve 30 including a valve seat 32 the periphery of which is controlled by a flexible diaphragm defining a valve member 34. The edge of the diaphragm is clamped to the casing 12 to define an operating pressure chamber 36, and a coil spring 38 is mounted in compression between the bottom casing wall of the operating pressure chamber 35 and valve member 34 such that the valve member 34 is biased toward engagement with valve seat 32. Downstream of the manual plug valve and upstream of main valve seat 32, the casing 12 has a bleed line conduit 40 leading from the inlet pressure chamber to a bleed line filter cavity 42 which communicates with a pair of branch bleed lines 44 and 46. Bleed line 44 communicates with a valve chamber 48 through a flow restrictor 50, and bleed line 46 communicates with valve chamber 48 through a bypass, bleed line valve 52. A bleed line passage 54 extends from valve chamber 48 to the underside of the main diaphragm valve member 34 to communicate with operating pressure chamber 36, and a bleed passage 56 establishes communication between main outlet 22 and valve chamber 48 through a pressure regulator 58 and a snap, bleed line valve 60.

The valve actuator assembly of the present invention can be used with any control device having a differential pressure operated diaphragm valve; and, accordingly, control device 10 has been described only generally above. For more detail with respect to a control device 10 that can be used with the present invention, reference is made to U.S. Pat. No. 3,513,873 issued May 26, 1970, the disclosure of which is incorporated herein by reference.

While the present invention can be used in various types of temperature control systems for heating and/or cooling apparatus, it will be described with burner apparatus of the heating type where main burner 20 is part of a furnace, not shown, supplying heat to an area or space under the control of a thermostat 62 sensing temperature in the space. Thermostat 62 includes a temperature responsive element, such as a bimetal, controlling a pair of switch contacts connected in series with a suitable source of electricity 64, such as the secondary winding of a transformer receiving electricity from a 110 volt source.

The dual valve actuator assembly of the present invention includes an electromagnetic operator having a U-shaped core 66 with winding 68 around one leg thereof and connected in series with thermostat 62 through terminals 69 on casing 12. Core 66 has a pair of parallel legs terminating at spaced pole faces 70 and 72 and controls an armature 74 which has a central portion 76 pivoting on pole face 70 as a fulcrum and an end 78 aligned with pole face 72. The electromagnetic operator is more specifically described in U.S. Pat. No. 3,544,936, the disclosure of which is incorporatd herein by reference. Armature 74 is offset beyond central portion 76 and terminates at an operating end in a tongue 80 of reduced width.

Figure 3:
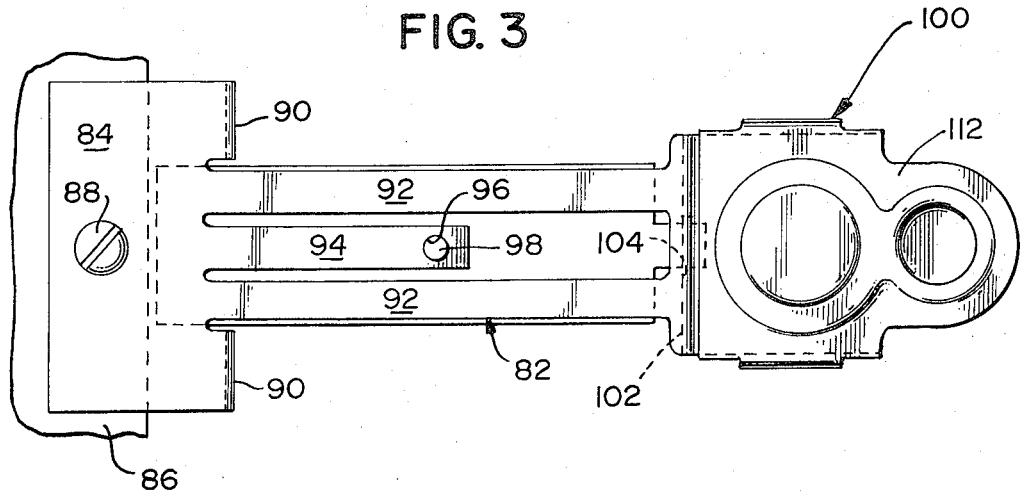
FIG. 3 is section taken along line 3—3 of FIG. 1.

Armature 74 operates a spring member 82 which has an end 84 mounted on a shoulder 86 in the casing by a screw 88. As best illustrated in FIG. 3, spring member 82 has a pair of perpendicularly bent flaps 90 spaced from the edges of the armature end 78, and spring member 82 has a pair of parallel, spaced arms 92 extending from end 84; a keeper spring 94 extending between the arms 92 is normally biased against the armature and has an aperture 96 in a free end thereof to receive a projection 98 which extends perpendicularly from the armatur 74 to pin or connect the armature 74 and keeper spring 94. Keeper spring 94 is tensioned to apply a counterclockwise force, looking at FIG. 1, to armature 74 to bias central portion 76 against pole face 70. Spring member 82 is tensioned such that it is resiliently biased counterclockwise, looking at FIG. 1, about shoulder 86 with the flaps 90 straddling the armature 74 and pole face 72; thus, ther is no contact between the flaps 90 and the pole face 72 so as to preclude a magnetic short circuit. Spring member 82 includes an end 100 carried by arms 92, the end 100 joining arms 92 via an offset intermediate portion 102 with a slot 104 therein receiving tongue 80. The width of slot 104 is greater than the width of tongue 80 to facilitate snap movement of spring member 82. End 100 carries a valve member 106 for the snap valve 60 including a membrane 108 backed up by a resilient pad 110; and, at a reduced end portion 112, spring member 82 has a protrusion for engaging a valve member 114 of bypass valve 52.

Snap valve 60 has a valve seat 116 cooperating with membrane 108, and bypass valve 52 has a valve seat 118 for engagement with a head 120 on valve member 114. Valve member 114 has a bulbous end 120, and a coil spring 122 is mounted in compression between end 120 of valve member 114 and a wall of the casing surrounding valve seat 118 such that the valve member 114 is resiliently biased against spring member 82.

In operation, once the pilot burner is properly lit, main valve 30 is operated in response to the temperature in the area or space as sensed by the thermostat 62. When the temperature in the space is above a set point preset in the thermostat 62, the thermostat contacts will be open, and no electricity will be supplied to winding 68. With winding 68 deenergized, the tension of spring member 82 forces valve member 106 against valve seat 116 to close snap valve 60, and the tension spring member 82 overcomes coil spring 124 to move valve member 114 away from valve seat 118 to open bypass valve 52. Thus, valve chamber 48 communicates with the inlet pressure chamber upstream of main diaphragm valve 30 through bleed line conduit 40, filter cavity 42, bleed line branch 46 and bypass valve 52; and, since valve chamber 48 and operating pressure chamber 36 are in communication through bleed line passage 54, the pressure on opposite sides of the main valve member disphragm are equal, and spring 38 forces valve member 34 against valve seat 32 to close the main valve and prevent fuel flow through main outlet 22 to the main burner 20.

If the temperature in the space drops below the set point, the contacts of thermostat 62 will close to energize winding 68 and pull in end 78 of armature 74 against pole face 72 to place the actuator assembly in the open state, as shown in FIG. 2. The pull in of the armature 74 moves the spring member 82 with a snap action due to the lost motion between tongue 80 and slot 104 to substantially simultaneously open snap valve 60 and close bypass valve 52. That is, initial movement of armature 74 about the fulcrum formed by pole face 70 facilitated due to the space between the edge of slot 104 and tongue 80; however, once tongue 80 engages the edge of slot 104, the pull in force applied to armature 74 overcomes the force from spring member 82 to move the spring member clockwise, looking at FIG. 2, to move valve member 106 away from valve seat 116 to open the snap valve 60 and to permit coil spring 124 to move valve member 114 againt valve seat 118 to close bypass valve 52. With bypass valve 52 closed and snap valve 60 open, the pressure in valve chamber 48 is controlled by pressure regulator 58 which senses main outlet pressure through bleed passage 56 such that the pressure in valve chamber 48 is less than the pressure in the inlet chamber. Thus, the pressure differential across the main valve member diaphragm overcomes spring 38 to open the main valve 30, and the outlet pressure is regulated as fuel is supplied to the main burner 20 since the pressure in operating chamber 36 is controlled by the pressure regulator 58.

Once the space has been heated beyond the set point, the contacts of thermostat 62 will open to deenergize winding 68, and the force from spring member 82 will move valve member 106 back into engagement with valve seat 116 and will move valve member 114 away from valve seat 118 to close snap valve 60 and open bypass valve 52 substantially simultaneously with a snap action.

The spring action of spring member 82 coupled with the pull in and release of the electromagnetic operator provide snap action operation independent of pressure effect as the dual valve actuator assembly changes between open and closed states and between closed and open states and thereby prevents throttling. The configuration of the spring member further prevents hang up and sticking during operation, particularly due to the interaction between tongue 80 and slot 104 and the combination of the pinned keeper spring 94 and the relationship between end 78 of the armature and flaps 90 of the level spring minimizes shifting of the armature relative to the pole faces.

Inasmuch as the present invention is subject to many variations, modifications and changes in detail, it is intended that all subject matter described above or shown in the drawings be interpreted as illustrative and not in a limiting sense.

What is claimed is:

1. A valve actuator assembly comprising
a casing having a valve seat formed therein;
an electromagnetic operator disposed in said casing having first and second spaced pole faces;
an armature having a central portion engaging said first pole face, a first end aligned with said second pole face and a second end extending beyond said electromagnetic operator; and
a spring member having a first end mounted on a shoulder in said casing, a second end carrying a valve member in alignment with said valve seat and a portion intermediate said first and second ends engaging said second end of said armature such that movement of said armature imparts movement to said spring member, said spring member being tensioned to bias said valve member toward said valve seat and to bias said central portion of said armature against said first pole face,
said valve member engaging said valve seat and said first end of said armature being spaced from said second pole face by the tension of said spring member when said electromagnetic operator is deenergized and said valve member being moved away from said valve seat and said first end of said armature being pulled in to contact said second pole face against the tension of said spring member when said electromagnetic operator is energized.

2. The valve actuator assembly as recited in claim 1 wherein said intermediate portion of said spring member has a slot therein and said second end of said armature has a tongue extending through said slot in said spring member, the width of said tongue being less than the width of said slot such that said tongue can move in said slot without movement of said spring member.

3. The valve actuator assembly as recited in claim 1 wherein said spring member includes a keeper spring pinned to said armature to bias said armature against said first pole face.

4. The valve actuator assembly as recited in claim 1 wherein said casing has a second valve seat formed therein and further comprising a second valve member cooperating with said second valve seat and spring means biasing an end of said second valve member against said second end of said spring member and said second valve member toward said second valve seat whereby movement of said spring member controls both the first and second valve members.

5. The valve actuator assembly as recited in claim 4 wherein said spring member includes a keeper spring pinned to said armature to bias said armature against said first pole face.

6. The valve actuator assembly as recited in claim 5 wherein said intermediate portion of said spring member has a slot therein and said second end of said armature has a tongue extending through said slot in said spring member, the width of said tongue being less than the width of said slot such that said tongue can move in said slot without movement of said spring member.

7. The valve actuator assembly as recited in claim 6 wherein said keeper spring has an aperture therein and said armature has a projection extending through said aperture to pin said keeper spring to said armature.

8. In a control device including a casing having an inlet, an outlet, a main differential pressure operated valve controlling flow between the inlet and the outlet and having a diaphragm defining an inlet chamber and an operating pressure chamber on opposite sides of the diaphragm, a bleed line communicating with the inlet chamber, a bleed passage communicating with the outlet, a valve chamber and a passage communicating with the valve chamber and the operating pressure chamber, a dual valve actuator assembly comprising
first valve means including a first valve seat and a first valve member controlling flow between the bleed line and the valve chamber;
second valve means including a second valve seat and a second valve member controlling flow between the bleed passage and the valve chamber;
an electromagnetic operator disposed in the casing having first and second spaced pole faces;
an armature having a first end aligned with said first pole face, a second end extending beyond said electromagnetic operator and a central portion between said first and second ends engaging said second pole face, said armature being pivotal about said second pole face; and
a spring member having a first end mounted on a shoulder in the casing, a second end engaging said first and second valve members and an intermediate portion engaging said second end of said armature such that movement of said armature is imparted to said spring member, said spring member being tensioned to bias said first valve member away from said first valve seat and said second valve member toward said second valve seat and said spring member including a keeper spring engaging said armature to bias said central portion of said armature against said second pole face,
said dual valve actuator assembly having an open state with said electromagnetic operator energized wherein said first end of said armature is pulled into contact said first pole face to pivot said armature about said second pole face to impart movement to said spring member to close said first valve means and open said second valve means and having a closed state with said electromagnetic operator deenergized wherein said first end of said armature is spaced from said first pole face by the tension of said spring member and said spring member opens said first valve means and closes said second valve means.

9. The dual valve actuator assembly as recited in claim 8 wherein said first valve means includes spring means biasing said first valve member toward said first valve seat and against said second end of said spring member, and said second valve member is carried by said spring member.

10. The dual valve actuator assembly as recited in claim 9 wherein said spring member includes a pair of spaced arms extending between said first and second ends of said spring member and said keeper spring extends from said first end of spring member between said arms and has a free end pinned to said armature.

11. The valve actuator assembly as recited in claim 10 wherein said intermediate portion of said spring member has a slot therein and said second end of said armature has a tongue extending through said slot in said spring member, the width of said tongue being less than the width of said slot such that said tongue can move in said slot without movement of said spring member.

* * * * *